(12) United States Patent
Dublish et al.

(10) Patent No.: US 7,941,309 B2
(45) Date of Patent: May 10, 2011

(54) MODELING IT OPERATIONS/POLICIES

(75) Inventors: Pratul Dublish, Sammamish, WA (US); Bassam Tabbara, Seattle, WA (US); Geoffrey H. Outhred, Seattle, WA (US); Jeffrey B. Parham, Redmond, WA (US); Kevin D. J. Grealish, Seattle, WA (US); Praerit Garg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1538 days.

(21) Appl. No.: 11/266,156

(22) Filed: Nov. 2, 2005

(65) Prior Publication Data

US 2007/0112847 A1    May 17, 2007

(51) Int. Cl.
G06F 17/50    (2006.01)
(52) U.S. Cl. .............................. 703/13; 703/22; 709/224
(58) Field of Classification Search .................... 703/13, 703/22; 707/999, 103, 999.103; 709/224
See application file for complete search history.

(56) References Cited

U.S. PATENT DOCUMENTS

| | | | |
|---|---|---|---|
| 4,200,770 A | 4/1980 | Hellman et al. |
| 4,218,582 A | 8/1980 | Hellman et al. |
| 4,405,829 A | 9/1983 | Rivest et al. |
| 4,424,414 A | 1/1984 | Hellman et al. |
| 5,031,089 A | 7/1991 | Liu et al. |
| 5,115,505 A | 5/1992 | Bishop et al. |
| 5,220,621 A | 6/1993 | Saitoh |
| 5,371,852 A | 12/1994 | Attanasio et al. |
| 5,430,810 A | 7/1995 | Saeki |
| 5,475,817 A | 12/1995 | Waldo et al. |
| 5,490,276 A | 2/1996 | Doli, Jr. et al. |
| 5,495,610 A | 2/1996 | Shing et al. |
| 5,499,357 A | 3/1996 | Sonty et al. |
| 5,504,921 A | 4/1996 | Dev et al. |
| 5,539,883 A | 7/1996 | Allon et al. |
| 5,557,774 A | 9/1996 | Shimabukuro et al. |
| 5,579,482 A | 11/1996 | Einkauf et al. |
| 5,668,995 A | 9/1997 | Bhat |
| 5,686,940 A | 11/1997 | Kuga |

(Continued)

FOREIGN PATENT DOCUMENTS

CN    1368694    9/2002

(Continued)

OTHER PUBLICATIONS

Hitchens et al., Design and Specification of Role Based Access Control Policies, IEE Proceedings, 2000, pp. 117-129.*

(Continued)

*Primary Examiner* — Russell Frejd
(74) *Attorney, Agent, or Firm* — Lee & Hayes, PLLC

(57) ABSTRACT

Modeling operational policies of operating a business's or institution's actual or planned IT system. The IT system may include components such as applications, application hosts, one or more networks or components thereof, hardware, and interrelationships between the components. The IT system is to be operated in accordance with operational policies that govern existence or numerosity of components, how the components are interrelated, how the components and interrelationships are configured, and/or manual or automated processes for managing and maintaining the IT system. The modeling may involve generating code that conforms to a language by declaring abstractions using types that correspond to the components of the IT system, by declaring types of interrelationships that correspond to the interrelationships of the IT system, and by defining constraints upon and between the abstract types, where the constraints correspond to operational policies of operating the IT system.

20 Claims, 12 Drawing Sheets

U.S. PATENT DOCUMENTS

| | | | |
|---|---|---|---|
| 5,724,508 A | 3/1998 | Harple, Jr. et al. |
| 5,748,958 A | 5/1998 | Badovinatz et al. |
| 5,758,351 A | 5/1998 | Gibson et al. |
| 5,768,271 A | 6/1998 | Seid et al. |
| 5,774,660 A | 6/1998 | Brendel et al. |
| 5,774,668 A | 6/1998 | Choquier et al. |
| 5,774,689 A | 6/1998 | Curtis et al. |
| 5,784,463 A | 7/1998 | Chen et al. |
| 5,790,895 A | 8/1998 | Krontz et al. |
| 5,801,970 A | 9/1998 | Rowland et al. |
| 5,802,590 A | 9/1998 | Draves |
| 5,815,574 A | 9/1998 | Fortinsky |
| 5,818,937 A | 10/1998 | Watson |
| 5,822,531 A | 10/1998 | Gorczyca et al. |
| 5,826,015 A | 10/1998 | Schmidt |
| 5,845,124 A | 12/1998 | Berman |
| 5,845,277 A | 12/1998 | Pfeil et al. |
| 5,850,399 A | 12/1998 | Ganmukhi et al. |
| 5,867,706 A | 2/1999 | Martin et al. |
| 5,872,914 A | 2/1999 | Walker, Jr. et al. |
| 5,872,928 A | 2/1999 | Lewis et al. |
| 5,878,220 A | 3/1999 | Olkin et al. |
| 5,895,499 A | 4/1999 | Chu |
| 5,905,728 A | 5/1999 | Han et al. |
| 5,917,730 A | 6/1999 | Rittie et al. |
| 5,918,017 A | 6/1999 | Attanasio et al. |
| 5,930,798 A | 7/1999 | Lawler et al. |
| 5,938,732 A | 8/1999 | Lim et al. |
| 5,948,055 A | 9/1999 | Pulsipher et al. |
| 5,951,694 A | 9/1999 | Choquier et al. |
| 5,958,009 A | 9/1999 | Friedrich et al. |
| 5,960,371 A | 9/1999 | Saito et al. |
| 5,968,126 A | 10/1999 | Ekstrom et al. |
| 6,012,113 A | 1/2000 | Tuckner |
| 6,035,405 A | 3/2000 | Gage et al. |
| 6,041,054 A | 3/2000 | Westberg |
| 6,047,323 A | 4/2000 | Krause |
| 6,047,325 A | 4/2000 | Jain et al. |
| 6,049,528 A | 4/2000 | Hendel et al. |
| 6,052,469 A | 4/2000 | Johnson et al. |
| 6,059,842 A | 5/2000 | Dumarot et al. |
| 6,065,058 A | 5/2000 | Hailpern et al. |
| 6,067,580 A | 5/2000 | Aman et al. |
| 6,070,243 A | 5/2000 | See et al. |
| 6,073,183 A | 6/2000 | Slonim |
| 6,073,227 A | 6/2000 | Abily et al. |
| 6,075,776 A | 6/2000 | Tanimoto et al. |
| 6,076,108 A | 6/2000 | Courts et al. |
| 6,081,826 A | 6/2000 | Masuoka et al. |
| 6,085,238 A | 7/2000 | Yuasa et al. |
| 6,086,618 A | 7/2000 | Al-Hilali et al. |
| 6,097,818 A | 8/2000 | Saito |
| 6,098,093 A | 8/2000 | Bayeh et al. |
| 6,108,699 A | 8/2000 | Moiin |
| 6,108,702 A | 8/2000 | Wood |
| 6,111,993 A | 8/2000 | Matsunaga |
| 6,112,243 A | 8/2000 | Downs et al. |
| 6,115,393 A | 9/2000 | Engel et al. |
| 6,118,785 A | 9/2000 | Araujo et al. |
| 6,125,442 A | 9/2000 | Maves et al. |
| 6,125,447 A | 9/2000 | Gong |
| 6,134,594 A | 10/2000 | Helland et al. |
| 6,141,749 A | 10/2000 | Coss et al. |
| 6,144,959 A | 11/2000 | Anderson et al. |
| 6,147,995 A | 11/2000 | Dobbins et al. |
| 6,151,688 A | 11/2000 | Wipfel et al. |
| 6,167,052 A | 12/2000 | McNeill et al. |
| 6,167,383 A | 12/2000 | Henson |
| 6,167,515 A | 12/2000 | Lin |
| 6,178,529 B1 | 1/2001 | Short et al. |
| 6,182,275 B1 | 1/2001 | Beelitz et al. |
| 6,185,308 B1 | 2/2001 | Ando et al. |
| 6,192,401 B1 | 2/2001 | Modiri et al. |
| 6,195,091 B1 | 2/2001 | Harple et al. |
| 6,195,355 B1 | 2/2001 | Demizu |
| 6,208,345 B1 | 3/2001 | Sheard et al. |
| 6,208,649 B1 | 3/2001 | Kloth |
| 6,209,099 B1 | 3/2001 | Saunders |
| 6,212,559 B1 | 4/2001 | Bixler et al. |
| 6,215,877 B1 | 4/2001 | Matsumoto |
| 6,215,878 B1 | 4/2001 | Harkins |
| 6,226,788 B1 | 5/2001 | Schoening et al. |
| 6,230,312 B1 | 5/2001 | Hunt |
| 6,233,610 B1 | 5/2001 | Hayball et al. |
| 6,236,365 B1 | 5/2001 | LeBlanc et al. |
| 6,236,729 B1 | 5/2001 | Takaragi et al. |
| 6,236,901 B1 | 5/2001 | Goss |
| 6,237,020 B1 | 5/2001 | Leymann et al. |
| 6,253,230 B1 | 6/2001 | Couland et al. |
| 6,256,773 B1 | 7/2001 | Bowman-Amuah |
| 6,259,448 B1 | 7/2001 | McNally et al. |
| 6,263,089 B1 | 7/2001 | Otsuka et al. |
| 6,266,707 B1 | 7/2001 | Boden et al. |
| 6,269,076 B1 | 7/2001 | Shamir et al. |
| 6,269,079 B1 | 7/2001 | Marin et al. |
| 6,272,522 B1 | 8/2001 | Lin et al. |
| 6,272,523 B1 | 8/2001 | Factor |
| 6,304,972 B1 | 10/2001 | Shavit |
| 6,305,015 B1 | 10/2001 | Akriche et al. |
| 6,308,174 B1 | 10/2001 | Hayball et al. |
| 6,311,144 B1 | 10/2001 | Abu El Ata |
| 6,311,270 B1 | 10/2001 | Challener et al. |
| 6,317,438 B1 | 11/2001 | Trebes, Jr. |
| 6,324,571 B1 | 11/2001 | Hacherl |
| 6,327,622 B1 | 12/2001 | Jindal et al. |
| 6,330,602 B1 | 12/2001 | Law et al. |
| 6,330,605 B1 | 12/2001 | Christensen et al. |
| 6,336,138 B1 | 1/2002 | Caswell et al. |
| 6,336,171 B1 | 1/2002 | Coskrey, IV |
| 6,338,112 B1 | 1/2002 | Wipfel et al. |
| 6,341,356 B1 | 1/2002 | Johnson et al. |
| 6,351,685 B1 | 2/2002 | Dimitri et al. |
| 6,353,806 B1 | 3/2002 | Gehlot |
| 6,353,861 B1 | 3/2002 | Dolin, Jr. et al. |
| 6,353,898 B1 | 3/2002 | Wipfel et al. |
| 6,360,265 B1 | 3/2002 | Falck et al. |
| 6,366,578 B1 | 4/2002 | Johnson |
| 6,367,010 B1 | 4/2002 | Venkatram et al. |
| 6,370,573 B1 | 4/2002 | Bowman-Amuah |
| 6,370,584 B1 | 4/2002 | Bestavros et al. |
| 6,377,996 B1 | 4/2002 | Lumelsky et al. |
| 6,389,464 B1 | 5/2002 | Krishnamurthy et al. |
| 6,393,386 B1 | 5/2002 | Zager et al. |
| 6,393,456 B1 | 5/2002 | Ambler et al. |
| 6,393,474 B1 | 5/2002 | Eichert et al. |
| 6,393,485 B1 | 5/2002 | Chao et al. |
| 6,408,390 B1 | 6/2002 | Saito |
| 6,418,554 B1 | 7/2002 | Delo et al. |
| 6,424,718 B1 | 7/2002 | Holloway |
| 6,424,992 B2 | 7/2002 | Devarakonda et al. |
| 6,427,163 B1 | 7/2002 | Arendt et al. |
| 6,427,171 B1 | 7/2002 | Craft et al. |
| 6,434,598 B1 | 8/2002 | Gish |
| 6,438,100 B1 | 8/2002 | Halpern et al. |
| 6,442,557 B1 | 8/2002 | Buteau et al. |
| 6,442,713 B1 | 8/2002 | Block et al. |
| 6,449,641 B1 | 9/2002 | Moiin et al. |
| 6,449,650 B1 | 9/2002 | Westfall et al. |
| 6,457,048 B2 | 9/2002 | Sondur et al. |
| 6,463,536 B2 | 10/2002 | Saito |
| 6,466,932 B1 | 10/2002 | Dennis et al. |
| 6,466,978 B1 | 10/2002 | Mukherjee et al. |
| 6,466,984 B1 | 10/2002 | Naveh et al. |
| 6,466,985 B1 | 10/2002 | Goyal et al. |
| 6,470,025 B1 | 10/2002 | Wilson et al. |
| 6,470,332 B1 | 10/2002 | Weschler |
| 6,470,464 B2 | 10/2002 | Bertram et al. |
| 6,473,791 B1 | 10/2002 | Al-Ghosein et al. |
| 6,480,955 B1 | 11/2002 | DeKoning et al. |
| 6,484,261 B1 | 11/2002 | Wiegel |
| 6,487,622 B1 | 11/2002 | Coskrey, IV et al. |
| 6,493,715 B1 | 12/2002 | Funk et al. |
| 6,496,187 B1 | 12/2002 | Deering et al. |
| 6,502,131 B1 | 12/2002 | Vaid et al. |
| 6,505,244 B1 | 1/2003 | Natarajan et al. |
| 6,510,154 B1 | 1/2003 | Mayes et al. |
| 6,510,509 B1 | 1/2003 | Chopra et al. |

| | | |
|---|---|---|
| 6,519,615 B1 | 2/2003 | Wollrath et al. |
| 6,529,953 B1 | 3/2003 | Van Renesse |
| 6,539,494 B1 | 3/2003 | Abramson et al. |
| 6,546,423 B1 | 4/2003 | Dutta et al. |
| 6,546,553 B1 | 4/2003 | Hunt |
| 6,549,516 B1 | 4/2003 | Albert et al. |
| 6,549,934 B1 | 4/2003 | Peterson et al. |
| 6,564,261 B1 | 5/2003 | Gudjonsson et al. |
| 6,570,847 B1 | 5/2003 | Hosein |
| 6,570,875 B1 | 5/2003 | Hegde |
| 6,574,195 B2 | 6/2003 | Roberts |
| 6,578,144 B1 | 6/2003 | Gennaro et al. |
| 6,584,499 B1 | 6/2003 | Jantz et al. |
| 6,587,876 B1 | 7/2003 | Mahon et al. |
| 6,597,956 B1 | 7/2003 | Aziz et al. |
| 6,598,077 B2 | 7/2003 | Primak et al. |
| 6,598,173 B1 | 7/2003 | Sheikh et al. |
| 6,598,223 B1 | 7/2003 | Vrhel, Jr. et al. |
| 6,601,101 B1 | 7/2003 | Lee et al. |
| 6,601,233 B1 | 7/2003 | Underwood |
| 6,606,708 B1 | 8/2003 | Devine et al. |
| 6,609,148 B1 | 8/2003 | Salo et al. |
| 6,609,213 B1 | 8/2003 | Nguyen et al. |
| 6,611,522 B1 | 8/2003 | Zheng et al. |
| 6,615,256 B1 | 9/2003 | van Ingen et al. |
| 6,628,671 B1 | 9/2003 | Dynarski et al. |
| 6,631,141 B1 | 10/2003 | Kumar et al. |
| 6,640,303 B1 | 10/2003 | Vu |
| 6,651,101 B1 | 11/2003 | Gai et al. |
| 6,651,240 B1 | 11/2003 | Yamamoto et al. |
| 6,654,782 B1 | 11/2003 | O'Brien et al. |
| 6,654,796 B1 | 11/2003 | Slater et al. |
| 6,665,714 B1 | 12/2003 | Blumenau et al. |
| 6,671,699 B1 | 12/2003 | Black et al. |
| 6,675,308 B1 | 1/2004 | Thomsen |
| 6,678,821 B1 | 1/2004 | Waugh et al. |
| 6,678,835 B1 | 1/2004 | Shah et al. |
| 6,681,262 B1 | 1/2004 | Rimmer |
| 6,684,335 B1 | 1/2004 | Epstein, III et al. |
| 6,691,148 B1 | 2/2004 | Loyall et al. |
| 6,691,165 B1 | 2/2004 | Bruck et al. |
| 6,691,168 B1 | 2/2004 | Bal et al. |
| 6,694,436 B1 | 2/2004 | Audebert |
| 6,701,363 B1 | 3/2004 | Chiu et al. |
| 6,717,949 B1 | 4/2004 | Boden et al. |
| 6,718,361 B1 | 4/2004 | Basani et al. |
| 6,718,379 B1 | 4/2004 | Krishna et al. |
| 6,725,253 B1 | 4/2004 | Okano et al. |
| 6,728,885 B1 | 4/2004 | Taylor et al. |
| 6,735,596 B2 | 5/2004 | Corynen |
| 6,738,736 B1 | 5/2004 | Bond |
| 6,741,266 B1 | 5/2004 | Kamiwada et al. |
| 6,742,020 B1 | 5/2004 | Dimitroff et al. |
| 6,748,447 B1 | 6/2004 | Basani et al. |
| 6,754,716 B1 | 6/2004 | Sharma et al. |
| 6,754,816 B1 | 6/2004 | Layton et al. |
| 6,757,744 B1 | 6/2004 | Narisi et al. |
| 6,760,765 B1 | 7/2004 | Asai et al. |
| 6,760,775 B1 | 7/2004 | Anerousis et al. |
| 6,769,008 B1 | 7/2004 | Kumar et al. |
| 6,769,060 B1 | 7/2004 | Dent et al. |
| 6,779,016 B1 | 8/2004 | Aziz et al. |
| 6,782,408 B1 | 8/2004 | Chandra et al. |
| 6,789,090 B1 | 9/2004 | Miyake et al. |
| 6,801,528 B2 | 10/2004 | Nassar |
| 6,801,937 B1 | 10/2004 | Novaes et al. |
| 6,801,949 B1 | 10/2004 | Bruck et al. |
| 6,804,783 B1 | 10/2004 | Wesinger, Jr. et al. |
| 6,813,778 B1 | 11/2004 | Poli et al. |
| 6,816,897 B2 | 11/2004 | McGuire |
| 6,820,042 B1 | 11/2004 | Cohen et al. |
| 6,820,121 B1 | 11/2004 | Callis et al. |
| 6,823,299 B1 | 11/2004 | Contreras et al. |
| 6,823,373 B1 | 11/2004 | Pancha et al. |
| 6,823,382 B2 | 11/2004 | Stone |
| 6,829,639 B1 | 12/2004 | Lawson et al. |
| 6,829,770 B1 | 12/2004 | Hinson et al. |
| 6,836,750 B2 | 12/2004 | Wong et al. |
| 6,845,160 B1 | 1/2005 | Aoki |
| 6,853,841 B1 | 2/2005 | St. Pierre |
| 6,854,069 B2 | 2/2005 | Kampe et al. |
| 6,856,591 B1 | 2/2005 | Ma et al. |
| 6,862,613 B1 | 3/2005 | Kumar et al. |
| 6,868,062 B1 | 3/2005 | Yadav et al. |
| 6,868,454 B1 | 3/2005 | Kubota et al. |
| 6,879,926 B2 | 4/2005 | Schmit et al. |
| 6,880,002 B2 | 4/2005 | Hirschfeld et al. |
| 6,886,038 B1 | 4/2005 | Tabbara et al. |
| 6,888,807 B2 | 5/2005 | Heller et al. |
| 6,895,534 B2 | 5/2005 | Wong et al. |
| 6,898,791 B1 | 5/2005 | Chandy et al. |
| 6,904,458 B1 | 6/2005 | Bishop et al. |
| 6,907,395 B1 | 6/2005 | Hunt et al. |
| 6,912,568 B1 | 6/2005 | Nishiki et al. |
| 6,915,338 B1 | 7/2005 | Hunt et al. |
| 6,922,791 B2 | 7/2005 | Mashayekhi et al. |
| 6,928,482 B1 | 8/2005 | Ben Nun et al. |
| 6,944,183 B1 | 9/2005 | Iyer et al. |
| 6,944,759 B1 | 9/2005 | Crisan |
| 6,947,987 B2 | 9/2005 | Boland |
| 6,954,930 B2 | 10/2005 | Drake et al. |
| 6,957,186 B1 | 10/2005 | Guheen et al. |
| 6,963,981 B1 | 11/2005 | Bailey et al. |
| 6,968,291 B1 | 11/2005 | Desai |
| 6,968,535 B2 | 11/2005 | Stelting et al. |
| 6,968,550 B2 | 11/2005 | Branson et al. |
| 6,968,551 B2 | 11/2005 | Hediger et al. |
| 6,971,063 B1 | 11/2005 | Rappaport et al. |
| 6,971,072 B1 | 11/2005 | Stein |
| 6,973,620 B2 | 12/2005 | Gusler et al. |
| 6,973,622 B1 | 12/2005 | Rappaport et al. |
| 6,976,079 B1 | 12/2005 | Ferguson et al. |
| 6,976,269 B1 | 12/2005 | Avery, IV et al. |
| 6,978,379 B1 | 12/2005 | Goh et al. |
| 6,983,317 B1 | 1/2006 | Bishop et al. |
| 6,985,956 B2 | 1/2006 | Luke et al. |
| 6,986,133 B2 | 1/2006 | O'Brien et al. |
| 6,986,135 B2 | 1/2006 | Leathers et al. |
| 6,990,666 B2 | 1/2006 | Hirschfeld et al. |
| 7,003,562 B2 | 2/2006 | Mayer |
| 7,003,574 B1 | 2/2006 | Bahl |
| 7,012,919 B1 | 3/2006 | So et al. |
| 7,013,462 B2 | 3/2006 | Zara et al. |
| 7,016,950 B2 | 3/2006 | Tabbara et al. |
| 7,024,451 B2 | 4/2006 | Jorgenson |
| 7,027,412 B2 | 4/2006 | Miyamoto et al. |
| 7,028,228 B1 | 4/2006 | Lovy et al. |
| 7,035,786 B1 | 4/2006 | Abu El Ata et al. |
| 7,035,930 B2 | 4/2006 | Graupner et al. |
| 7,043,407 B2 | 5/2006 | Lynch et al. |
| 7,043,545 B2 | 5/2006 | Tabbara et al. |
| 7,046,680 B1 | 5/2006 | McDysan et al. |
| 7,047,279 B1 | 5/2006 | Beams et al. |
| 7,047,518 B2 | 5/2006 | Little et al. |
| 7,050,961 B1 | 5/2006 | Lee et al. |
| 7,054,943 B1 | 5/2006 | Goldszmidt et al. |
| 7,055,149 B2 | 5/2006 | Birkholz et al. |
| 7,058,704 B1 | 6/2006 | Mangipudi et al. |
| 7,058,826 B2 | 6/2006 | Fung |
| 7,058,858 B2 | 6/2006 | Wong et al. |
| 7,062,718 B2 | 6/2006 | Kodosky et al. |
| 7,069,204 B1 | 6/2006 | Solden et al. |
| 7,069,432 B1 | 6/2006 | Tighe et al. |
| 7,069,480 B1 | 6/2006 | Lovy et al. |
| 7,069,553 B2 | 6/2006 | Narayanaswamy et al. |
| 7,072,807 B2 | 7/2006 | Brown et al. |
| 7,072,822 B2 | 7/2006 | Humenansky et al. |
| 7,076,633 B2 | 7/2006 | Tormasov et al. |
| 7,080,143 B2 | 7/2006 | Hunt et al. |
| 7,082,464 B2 | 7/2006 | Hasan et al. |
| 7,089,281 B1 | 8/2006 | Kazemi et al. |
| 7,089,293 B2 | 8/2006 | Grosner et al. |
| 7,089,530 B1 | 8/2006 | Dardinski et al. |
| 7,093,005 B2 | 8/2006 | Patterson |
| 7,093,288 B1 | 8/2006 | Hydrie et al. |
| 7,096,258 B2 | 8/2006 | Hunt et al. |
| 7,099,936 B2 | 8/2006 | Chase et al. |
| 7,103,185 B1 | 9/2006 | Srivastava et al. |

| Patent Number | Date | Inventor |
|---|---|---|
| 7,103,874 B2 | 9/2006 | McCollum et al. |
| 7,113,900 B1 | 9/2006 | Hunt et al. |
| 7,117,158 B2 | 10/2006 | Weldon et al. |
| 7,117,261 B2 | 10/2006 | Kryskow, Jr. et al. |
| 7,120,154 B2 | 10/2006 | Bavant et al. |
| 7,124,289 B1 | 10/2006 | Suorsa |
| 7,127,625 B2 | 10/2006 | Farkas et al. |
| 7,130,881 B2 | 10/2006 | Volkov et al. |
| 7,131,123 B2 | 10/2006 | Suorsa et al. |
| 7,134,011 B2 | 11/2006 | Fung |
| 7,134,122 B1 | 11/2006 | Sero et al. |
| 7,139,930 B2 | 11/2006 | Mashayekhi et al. |
| 7,139,999 B2 | 11/2006 | Bowman-Amuah |
| 7,140,000 B2 | 11/2006 | Yucel |
| 7,143,420 B2 | 11/2006 | Radhakrishnan |
| 7,146,353 B2 | 12/2006 | Garg et al. |
| 7,150,015 B2 | 12/2006 | Pace et al. |
| 7,152,109 B2 | 12/2006 | Suorsa et al. |
| 7,152,157 B2 | 12/2006 | Murphy et al. |
| 7,155,380 B2 | 12/2006 | Hunt et al. |
| 7,155,490 B1 | 12/2006 | Malmer et al. |
| 7,162,427 B1 | 1/2007 | Myrick et al. |
| 7,162,509 B2 | 1/2007 | Brown et al. |
| 7,174,379 B2 | 2/2007 | Agarwal et al. |
| 7,181,731 B2 | 2/2007 | Pace et al. |
| 7,188,335 B1 | 3/2007 | Darr et al. |
| 7,191,344 B2 | 3/2007 | Lin et al. |
| 7,191,429 B2 | 3/2007 | Brassard et al. |
| 7,194,439 B2 | 3/2007 | Kassan et al. |
| 7,194,616 B2 | 3/2007 | Axnix et al. |
| 7,197,418 B2 | 3/2007 | Fuller, III et al. |
| 7,200,530 B2 | 4/2007 | Brown et al. |
| 7,200,655 B2 | 4/2007 | Hunt et al. |
| 7,203,911 B2 | 4/2007 | Williams |
| 7,210,143 B2 | 4/2007 | Or et al. |
| 7,213,231 B1 | 5/2007 | Bandhole et al. |
| 7,222,147 B1 | 5/2007 | Black et al. |
| 7,225,441 B2 | 5/2007 | Kozuch et al. |
| 7,231,410 B1 | 6/2007 | Walsh et al. |
| 7,246,351 B2 | 7/2007 | Bloch et al. |
| 7,254,634 B1 | 8/2007 | Davis et al. |
| 7,257,584 B2 | 8/2007 | Hirschfeld et al. |
| 7,275,156 B2 | 9/2007 | Balfanz et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,305,549 B2 | 12/2007 | Hunt et al. |
| 7,305,561 B2 | 12/2007 | Hunt et al. |
| 7,313,573 B2 | 12/2007 | Leung et al. |
| 7,315,801 B1 | 1/2008 | Dowd et al. |
| 7,318,216 B2 | 1/2008 | Diab |
| 7,333,000 B2 | 2/2008 | Vassallo |
| 7,343,601 B2 | 3/2008 | Azagury et al. |
| 7,349,891 B2 | 3/2008 | Charron et al. |
| 7,350,068 B2 | 3/2008 | Anderson et al. |
| 7,350,186 B2 | 3/2008 | Coleman et al. |
| 7,366,755 B1 | 4/2008 | Cuomo et al. |
| 7,367,028 B2 | 4/2008 | Kodosky et al. |
| 7,370,103 B2 | 5/2008 | Hunt et al. |
| 7,370,323 B2 | 5/2008 | Marinelli et al. |
| 7,376,125 B1 | 5/2008 | Hussain et al. |
| 7,379,982 B2 | 5/2008 | Tabbara |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,404,175 B2 | 7/2008 | Lee et al. |
| 7,406,517 B2 | 7/2008 | Hunt et al. |
| 7,406,692 B2 | 7/2008 | Halpern et al. |
| 7,409,420 B2 | 8/2008 | Pullara et al. |
| 7,461,249 B1 | 12/2008 | Pearson et al. |
| 7,464,147 B1 | 12/2008 | Fakhouri et al. |
| 7,478,381 B2 | 1/2009 | Roberts et al. |
| 7,478,385 B2 | 1/2009 | Sierer et al. |
| 7,480,907 B1 | 1/2009 | Marolia et al. |
| 7,496,911 B2 | 2/2009 | Rowley et al. |
| 7,506,338 B2 | 3/2009 | Alpern et al. |
| 7,512,942 B2 | 3/2009 | Brown et al. |
| 7,530,101 B2 | 5/2009 | Gallo et al. |
| 7,568,019 B1 * | 7/2009 | Bhargava et al. ............ 709/223 |
| 7,571,082 B2 * | 8/2009 | Gilpin et al. ............ 703/6 |
| 7,587,453 B2 | 9/2009 | Bhrara et al. |
| 7,594,224 B2 | 9/2009 | Patrick et al. |
| 7,624,086 B2 | 11/2009 | Keith, Jr. |
| 7,630,877 B2 * | 12/2009 | Brown et al. ............ 703/21 |
| 7,653,187 B2 | 1/2010 | Clark et al. |
| 7,653,903 B2 | 1/2010 | Purkeypile et al. |
| 7,743,373 B2 | 6/2010 | Avram et al. |
| 7,765,540 B2 | 7/2010 | McCollum et al. |
| 2001/0014158 A1 | 8/2001 | Baltzley |
| 2001/0016909 A1 | 8/2001 | Gehrmann |
| 2001/0019554 A1 | 9/2001 | Nomura et al. |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2001/0051937 A1 | 12/2001 | Ross et al. |
| 2002/0009079 A1 | 1/2002 | Jungck et al. |
| 2002/0010771 A1 | 1/2002 | Mandato |
| 2002/0022952 A1 | 2/2002 | Zager et al. |
| 2002/0038421 A1 | 3/2002 | Hamada |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0075844 A1 | 6/2002 | Hagen |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0095524 A1 | 7/2002 | Sanghvi et al. |
| 2002/0099785 A1 | 7/2002 | Teeple |
| 2002/0120761 A1 | 8/2002 | Berg |
| 2002/0131601 A1 | 9/2002 | Ninomiya et al. |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0184327 A1 | 12/2002 | Major et al. |
| 2002/0188941 A1 | 12/2002 | Cicciarelli et al. |
| 2002/0194342 A1 | 12/2002 | Lu et al. |
| 2002/0194345 A1 | 12/2002 | Lu et al. |
| 2002/0194369 A1 | 12/2002 | Rawlings et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0026426 A1 | 2/2003 | Wright et al. |
| 2003/0028642 A1 | 2/2003 | Agarwal et al. |
| 2003/0028770 A1 | 2/2003 | Litwin, Jr. et al. |
| 2003/0041139 A1 | 2/2003 | Beadles et al. |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Volpano |
| 2003/0126230 A1 | 7/2003 | Donatelli et al. |
| 2003/0126464 A1 | 7/2003 | McDaniel et al. |
| 2003/0130833 A1 | 7/2003 | Brownell et al. |
| 2003/0138105 A1 | 7/2003 | Challener et al. |
| 2003/0154404 A1 | 8/2003 | Beadles et al. |
| 2003/0165140 A1 | 9/2003 | Tang et al. |
| 2003/0200293 A1 | 10/2003 | Fearn et al. |
| 2003/0204734 A1 | 10/2003 | Wheeler |
| 2003/0206548 A1 | 11/2003 | Bannai et al. |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0049365 A1 | 3/2004 | Keller et al. |
| 2004/0049509 A1 | 3/2004 | Keller et al. |
| 2004/0054791 A1 | 3/2004 | Chakraborty et al. |
| 2004/0059812 A1 | 3/2004 | Assa |

| | | | | | | |
|---|---|---|---|---|---|---|
| 2004/0068631 | A1 | 4/2004 | Ukeda et al. | JP | 10285216 A | 10/1998 |
| 2004/0073443 | A1 | 4/2004 | Gabrick et al. | JP | 11007407 | 1/1999 |
| 2004/0073795 | A1 | 4/2004 | Jablon | JP | 11110256 A | 4/1999 |
| 2004/0078787 | A1 | 4/2004 | Borek et al. | JP | 8297567 | 11/1999 |
| 2004/0111315 | A1 | 6/2004 | Sharma et al. | JP | 11340980 A | 12/1999 |
| 2004/0117438 | A1 | 6/2004 | Considine et al. | JP | 11345180(A) | 12/1999 |
| 2004/0117476 | A1 | 6/2004 | Steele et al. | JP | 2000151574 A | 5/2000 |
| 2004/0160386 | A1 | 8/2004 | Michelitsch et al. | JP | 2000268012 A | 9/2000 |
| 2004/0161111 | A1 | 8/2004 | Sherman | JP | 2000293497 A | 10/2000 |
| 2004/0193388 | A1 | 9/2004 | Outhred et al. | JP | 2001339437 A | 12/2001 |
| 2004/0199572 | A1 | 10/2004 | Hunt et al. | JP | 2001526814 | 12/2001 |
| 2004/0205179 | A1 | 10/2004 | Hunt et al. | JP | 2002084302 | 3/2002 |
| 2004/0208292 | A1 | 10/2004 | Winterbottom | JP | 2002354006 A | 12/2002 |
| 2004/0220792 | A1* | 11/2004 | Gallanis et al. ............ 703/13 | JP | 2003006170 A | 1/2003 |
| 2004/0226010 | A1 | 11/2004 | Suorsa | JP | 2003030424 A | 1/2003 |
| 2004/0261079 | A1 | 12/2004 | Sen | JP | 2003058698 A | 2/2003 |
| 2004/0264481 | A1 | 12/2004 | Darling et al. | JP | 2003532784 | 11/2003 |
| 2004/0267920 | A1 | 12/2004 | Hydrie et al. | JP | 2005155729 | 6/2005 |
| 2004/0268357 | A1 | 12/2004 | Joy et al. | KR | 10-2002-0026751 | 4/2002 |
| 2004/0268358 | A1 | 12/2004 | Darling et al. | KR | 10-2004-0008275 | 1/2004 |
| 2005/0008001 | A1 | 1/2005 | Williams et al. | RU | 2111625 C1 | 5/1998 |
| 2005/0021742 | A1* | 1/2005 | Yemini et al. ............ 709/224 | RU | 2156546 C2 | 9/2000 |
| 2005/0055435 | A1 | 3/2005 | Gbadegesin et al. | RU | 2189072 C2 | 9/2002 |
| 2005/0080811 | A1 | 4/2005 | Speeter et al. | WO | WO9853410 | 11/1998 |
| 2005/0086502 | A1 | 4/2005 | Rayes et al. | WO | WO9930514 A2 | 6/1999 |
| 2005/0091078 | A1 | 4/2005 | Hunt et al. | WO | WO9963439 | 12/1999 |
| 2005/0091227 | A1 | 4/2005 | McCollum et al. | WO | WO0022526 | 4/2000 |
| 2005/0097097 | A1 | 5/2005 | Hunt et al. | WO | WO0031945 | 6/2000 |
| 2005/0097146 | A1 | 5/2005 | Konstantinou et al. | WO | WO0073929 | 12/2000 |
| 2005/0102154 | A1 | 5/2005 | Dodd et al. | WO | WO0230044 A2 | 4/2002 |
| 2005/0102388 | A1 | 5/2005 | Tabbara et al. | WO | WO0237748 | 5/2002 |
| 2005/0102513 | A1 | 5/2005 | Alve | WO | WO02085051 | 10/2002 |
| 2005/0102538 | A1 | 5/2005 | Hunt et al. | WO | WO033017615 A1 | 2/2003 |
| 2005/0125212 | A1 | 6/2005 | Hunt et al. | WO | WO03027876 A1 | 4/2003 |
| 2005/0138416 | A1 | 6/2005 | Qian et al. | WO | WO03039104 | 5/2003 |
| 2005/0152270 | A1 | 7/2005 | Gomez Paredes et al. | | | |
| 2005/0192971 | A1 | 9/2005 | Tabbara et al. | | | |
| 2005/0193103 | A1 | 9/2005 | Drabik | | | |

OTHER PUBLICATIONS

Siganos et al., Analyzing BGP Policies: Methodology and Tool, 23$^{rd}$ Annual Joint Conference of the IEEE Computer and Communications Societies, 2004, pp. 1640-1651.*

Toktar et al., RSVP Policy Control Using XACML, 5$^{th}$ IEEE International Workshop on Policies for Distributed Systems and Networks, 2004, pp. 87-96.*

Michael et al., Natural-Language Processing Support for Developing Policy-Governed Software Systems, 39$^{th}$ International Conference and Exhibition on Technology of Object-Oriented Languages and Systems, 2001, pp. 263-274.*

Morimoto, et al., "Compatibility Testing for Windows Server 2003", Microsoft Windows Server 2003 Unleashed, Chapter 18, Section 1, Jun. 14, 2004, 2 pages.

Lee, et al., "Community Services: A Toolkit for Rapid Deployment of Network Services", Proceedings of the IEEE International Conference on Cluster Computing, Cluster 2002, IEEE, 2002, 4 pages.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb. 20, 2007, 9 pgs.

Barrett et al., "Model Driven Distrution Pattern Design for Dynamic Web Service Compositions", ACM ICWE 2006, Jul. 11-14, 2006, Palo Alto, CA, USA, pp. 129-pp. 136.

Dolstra et al., "Imposing a Memory Management Discipline on Software Deployment", IEEE Procedeeding of the 26th International Conference on Software Engineering 2004, pp#1-pp#10.

Heilala et al., "Modeling and Simulation for Customer Driven Manufacturing System Design and Operations Planning", IEEE, Proceedings of the 2007 Winter Simulation Conference, 2007, pp. 1853-pp. 1862.

Yamasaki et al., "Model-Based Resource Selection for Efficient Virtual Cluster Deployment", ACM VTDC 2007, Nov. 12, 2007, Reno, NV, USA, pp. 1-pp. 7.

| | | | |
|---|---|---|---|
| 2005/0246529 | A1 | 11/2005 | Hunt et al. |
| 2005/0246771 | A1 | 11/2005 | Hunt et al. |
| 2005/0251783 | A1 | 11/2005 | Torone et al. |
| 2005/0257244 | A1 | 11/2005 | Joly et al. |
| 2005/0268325 | A1 | 12/2005 | Kuno et al. |
| 2006/0025984 | A1 | 2/2006 | Papaefstathiou et al. |
| 2006/0025985 | A1 | 2/2006 | Vinberg et al. |
| 2006/0031248 | A1 | 2/2006 | Vinberg et al. |
| 2006/0034263 | A1 | 2/2006 | Outhred et al. |
| 2006/0037002 | A1 | 2/2006 | Vinberg et al. |
| 2006/0048017 | A1 | 3/2006 | Anerousis et al. |
| 2006/0123040 | A1 | 6/2006 | McCarthy et al. |
| 2006/0149838 | A1 | 7/2006 | Hunt et al. |
| 2006/0155708 | A1 | 7/2006 | Brown et al. |
| 2006/0161879 | A1 | 7/2006 | Lubrecht et al. |
| 2006/0161884 | A1 | 7/2006 | Lubrecht et al. |
| 2006/0232927 | A1 | 10/2006 | Vinberg et al. |
| 2006/0235664 | A1 | 10/2006 | Vinberg et al. |
| 2006/0259609 | A1 | 11/2006 | Hunt et al. |
| 2006/0259610 | A1 | 11/2006 | Hunt et al. |
| 2006/0271341 | A1 | 11/2006 | Brown et al. |
| 2007/0006177 | A1 | 1/2007 | Aiber et al. |
| 2007/0112847 | A1 | 5/2007 | Dublish et al. |
| 2007/0192769 | A1 | 8/2007 | Mimura et al. |
| 2008/0059214 | A1 | 3/2008 | Vinberg et al. |

FOREIGN PATENT DOCUMENTS

| | | |
|---|---|---|
| CN | 1375685 | 10/2002 |
| EP | 0962861 A2 | 12/1999 |
| EP | 0964546 | 12/1999 |
| EP | 1063815 A2 | 12/2000 |
| EP | 1180886 A1 | 2/2002 |
| EP | 1307018 A1 | 5/2003 |
| EP | 1550969 A2 | 7/2005 |
| JP | 6250956 A | 9/1994 |
| JP | 8305609 A | 11/1996 |
| JP | 9034723 A | 2/1997 |
| JP | 9091143 A | 4/1997 |
| JP | 10124343 A | 5/1998 |
| JP | 10150470 A | 6/1998 |
| JP | 10240576 A | 9/1998 |

W3C: "Release Description Framework (RDF), Concepts and Abstract Syntax", <<http://www.w3.org/TR2004/REC-rdf-concepts-20040210>>, Feb. 10, 2004, XP002570908.

Heinl, et al., "A Comprehensive Approach to Flexibility in Workflow Management Systems", WACC 1999, ACM, 1999, pp. 79-88.

"Remote Operating Systems Installation", retrieved on Feb. 13, 2009 at <<http://technet.microsoft.com/en-us/library/bb742501.aspx>>, Microsoft TechNet, Sep. 9, 1999, pp. 1-28.

Sloman, "Policy Driven Management for Distributed Systems", Journal of Network and System Mangement, 1994, vol. 2, No. 4, Plenum Publishing Corporation 1994, pp. 333-pp. 360.

Yonezawa, "Feature article UML-compatible modeling tool front line, Ensure consistence between code and model, Applicable to a large-scale team development", DB Magazine, Japan, Mar. 1, 2002, vol. 11, No. 13. pp. 97-105.

Yuura, "Component-Oriented Development Method and Environment for Advanced Enterprises Information Systems", Japan, May 1, 1998, vol. 80 No. 5, pp. 25-30.

Notice of Rejection mailed May 28, 2010 (translation) for Japanese Patent Application No. 2004-064566, 8 pages.

Araki, "Linux Security Diary, Use VLAN in Linux", Linux Japan, Itsutsubashi Research Co.,ltd., vol. 3, No. 11, Nov. 1, 2008, pp. 110-113 (CSDB: National Academy Paper 200300158009.

Bagrodia, et al., "A Scalable Distributed Middleware Service Architecture to Support Mobile Internet Applications," Wireless Networks V.9 N. Jul. 4, 2003 Kluwer Academic Publishers. Manufacturered int he Netherlands; pp. 311-320.

Burns, et al., "Allocation and Data Placement Using Virtual Contiguity", pp. 1-6.

"C.O.B.A.S Centralized Out-Of-Band Authentication System", QT Worldtel Inc., Sep. 8-9, 2003, pp. 14.

Chao, "Next Generation Routers," Proceedings of the IEEE. vol. 90 No. 9 Sep. 2002.

Chen, et al., "Performance Prediction of Component-based Applications", available at least as early as Jan. 10, 2007, <<http://www.ug.it.usyd.edu.au/~iango/papers/jss_paper_draft_0503.pdf>>, pp. 1-12.

Choi, et al., "A High-Speed Multi-layer Lookup for Policy Based Packet Classification Using TCAM," Proceedings of the IASTED Interantional Conference Communication Systems and Networks Sep. 9-12, 2002 Malaga Spain.

Chunxiao, et al., Configure and move the e-Commerce Business Model by Utilizing XML, Applications of Computer Systems, No. 2, p. 8-11.

Cohen, et al., "On the Performance of TCP Splicing for URL-Aware Redirection," Proceedings of UITS' 99: The 2nd USENIX Symposium on Internet Technologies & Systems; Boulder Colorado USA Oct. 11-14, 1999; 10 pages.

Dekhil, et al., "Generalized Policy Model for Application and Service Management", Hewlett-Packard Laboratories, Software Technology Lab, 3 pages.

"Enhanced IP Services for Cisco Networks", retrieved on Jun. 19, 2007, at <<http://proquest.safaribooksonline.com/1578701066>>, Sep. 23, 1999, pp. 11.

Frolund, et al., "Design-Time Simulation of a Large-Scale, Distributed Object Systems" ACM 1998, pp. 374-400.

Garschhammer, et al., "Towards generic Service Management Concepts A Service Model Based Approach", 14 pages.

Gopal, et al., "Policy Based Access Router Selections and Context Transfers in Mobile IP," Network Control and Engineering for QoS; Security and Mobility (net-Con 2002).

Harbour, et al., "MAST An Open Environment for Modeling, Analysis, and Design of Real-Time Systems", available at least as early as Jan. 10, 2007, at <<http://citeseer.ist.psu.edu/cache/papers/cs/30959/http:zSzzSzwww.ctr.unican.eszSzpublicationsZSzmgh-jlm-jjg-jcp-jmd-2002a.pdf/mast-an-open-environment.pdf>>, pp. 1-16.

Hardwick, et al., "Modeling the Performance of E-Commerce Site", Jan. 6, 2007, at <<http://www.cs.cmu.edu/~jch/publications/hardwick01modeling.html>>, Journal of Computer Resource Management, 2002, pp. 1-11.

Howard at al., "Designing Secure Web-Based Applications for Microsoft Windows 2000", 2000.

"Integrated Secruity Management", OpenPMF(Policy Managment Framework), 2 pages.

Iyer, et al., "ClassiPI: An Archetecture for Fast and Flexible Packet Classification," IEEE Network, Mar./Apr. 2001, vol. 15 No. 2.

Kahn, "Report on DIMAC Workshop on Trust Management", retrieved on May 19, 2005 from <<http://web.archive.org/web/19970603132755/www.jya.com/dimacs.txt>>, 5 pages.

Kihl, et al., "Admission Control Schemes Guaranteeing Customer Q0S in Commercial Web Sites," Network Control and Engineering for QoS Security and Mobility (Net-Con 2002); Oct. 2002; pp. 305-316.

Kim, et al., "Content-Adaptive Request Distribution Strategy for INternet Server Cluster," W. Change (ed): Asia 2002 LNCs 2402 pp. 85-94 Aug. 2002. copyright Springer-Verlag Berlin Heidelberg 2002.

Kounev, "A Capacity Planning Methodology for Distributed E-Commerce Applications", Jan. 2, 2001, pp. 1-13 .

Levillain, et al., "Switch-Based Server Load Balancing for Enterprises," Alcatel Telecommunications Review; No. 4 pp. 298-302; 2002.

Li et al., "Hardware Design of a 2-D Motion Estimation System Based on the Hough Transform" IEEE 1998 16 pages.

Liu et al., "Visualization in Network Topology Optimization", ACM, 1992, pp. 131-138.

Mahon, "OpenView PolicyXpert: Heterogeneous Configuration and Control", OpenView Policy-Based Network Management, Feb. 1999, 4 pages.

Maughan et al., "Security Associations: Building Blocks for Secure Communications", IEEE—Symposium on Computers and Communications, pp. 157-163, 1995.

Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).

Moore, "Network Interoperability Program", MILCOM 97 Proceedings, vol. 3, pp. 1152-1155, 1997.

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

Norton, "Simalytic Hybrid Modeling Planning the Capacity of Client/Server Applications", available at least as early as Jan. 10, 2007, at <<http://citeseer.ist.psu.edu/cache/papers/cs/12830/http:zSzzSzwww.simalytic.comzSzRESUMEzSz., zSzIMACS97x.pdf/simalytic-hybrid-modeling-planning.pdf>>, Colorado Technical University, 1997, pp. 1-7.

"Pretty Good Privacy PGP for Personal Privacy, Version 5.0 for Windows 95 Windows NT", Pretty Good Privacy Inc., 1997, pp. 137.

Schneier, "Applied Cryptography Protocols, Algorithms and Source Code in C, Second Edition", 1996, John Wiley & Sons, Inc., New York, p. 461, pp. 466-468, pp. 513-514.

Selic, "A Generic Framework for Modeling Resources with UML", available at least as early as Jan. 10, 2007, at <<http://ieeexplore.ieee.org/iel5/2/18367/00846320.pdf?isNumber=>>, IEEE, Jun. 2000, pp. 64-69.

Shi et al., "An Effective Model for Composition of Secure Systems", The Journal of Systems and Software, 1998, pp, 233-244.

Smith, et al., "Distributed Management of Future Global Multi-Service Networks" British Telecommunications EngineeringLondon GB v. 13 part 3 Oct. 1 1994 pp. 221-226.

Somegawa, et al., "The Effects of Server Placement and server selection for Internet Services", IEICE Trans. Commun., vol. e86-b, No. 2, Feb. 2003, pp. 542-552.

Somers, "Hybrid: Unifying Centralised and Distributed Network Management using Intelligent Agents" IEEE Network Operations and Management Symposium Kyoto Apr. 15-19 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Sultan, et al., "Position Summary: Transport Layer Support for Highly-Available Network Services," Prejdgs. Eith Workshop on Itot Topics in Operating Systems. p. 182; May 2001.

Takahashi, et al., "APE: Fast and Secure Active Networking Architecture for Active Packet Editing," 2002 IEEE Open Architectures and Network Programming Proceedures; (Open ARCH 2002); Jun. 2002; pp. 104-113.

Uga, et al., "A High-Speed Packet Classification Using TCAM," IEICE Trans. On Communications vol. e85-b No. 9 Spetember 2002.

Vadim, "On Virtual Data Centers and Their Operating Environments", at <<http://www.hpl.hp.com/techreports/2001/HPL-2001-44.html>>, Mar. 8, 2001, pp. 1-20.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html], p. 1.

Wang, et al., "Layer-4 Service Differentiation and REsource Isolation," Proceedings of the Eightht IEEE Real-Time and Embedded Technology and Applications Symposium: Sep. 2002; 12 pages.

Webster's Seventh New Collegiate Dictionary. G. C. Merriam Co. Copyright 1971 pp. 438 and 767.

Yuhui, e-Commerce Based on ERP for Enterprize by Utilizing DNA and XML, Computer Engineering, vol. 27, No. 6, p. 165,166,182.

Menezes, et al., "Handbook of Applied Cryptography", CRC Press, 1996, Chapters 8 & 12, pp. 283-319 and 489-541.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

The Japanese Office Action mailed on Jan. 26, 2007 for Japanese Patent Application No. 2001-326848, a counterpart foreign application of US Patent No. 6,886,038.

The Japanese Office Action mailed on Dec. 14, 2007 for Japanese Patent Application No. 2001-326848, a counterpart foreign application of US Patent No. 6,886,038.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Meader, P., "Build Distributed Apps a New Way," *VSLive!*ShowDaily, San Francisco, Mar. 25, 2004, http://www.ftponline.com/reports/vslivesf/2004/whitehorse2/.

Meader, P., "Model Apps More Effectively," *VSLive!*ShowDaily, San Francisco, Mar. 24, 2004, http://www.ftponline.com/reports/vslivesf/2004/whitehorse/.

Tofts, C.. "HOLOS—A Simulation and Multi Mathematical Modelling Tool," Hewlett-Packard Compnay, 2001, http://www.hpl.hp.com/techreports/2001/HPL-2001-276.pdf.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Cardelli, L., "Type Systems," CRC Handbook of Computer Science and Engineering, 2nd Edition, Ch. 97, Wednesday, Feb. 25, 2004, 8:00pm © CRC Press., http://research.microsoft.com/Users/luca/Papers/TypeSystems.pdf.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx.

"System Definition Model," Windows Server System Home, http://www.microsoft.com/windowsserversystem/dsi/sdm.mspx.

Officer Young Tae Son; "International Search Report"; Korean Intellectual Property Office; Republic of Korea; Feb. 20, 2007.

UML, "OMG Unified Modeling Language Specification", Sep. 2001, Version 1.4, Retrvied from <<www.omg.org/spec/UML/1.4>>, pp#1-pp#566.

Nagase, "Catalysis: Development of Component Based Application by Using UML", bit, vol. 31, No. 7, pp. 37-45, Kyoritsu Publishing, Co., Ltd., Japan, Jul. 1, 1999.

Notice of Rejection from JP 2004-063225, dated Sep. 14, 2010. (contains reference to article by Nagase).

Graupner, et al., "A Framework for Analyzing and Organizing Complex Systems", Hewlett-Packard Company, 7th IEEE Conference on Engineering of Complex Computer Systems, Jun. 11-13, 2001, pp. 155-165.

\* cited by examiner

220

```xml
<!-- HostDependency and Contains are generic relationships
     used for modeling the e-Commerce web site -->
<RelationshipType Name="HostDependency">
  <Role Name="Host" Type="ClassValue" Cardinality="1"/>
  <Role Name="Guest" Type="ClassValue" Cardinality="*"/>
</RelationshipType>

<RelationshipType Name="Contains">
  <Role Name="Parent" Type="ClassValue" Cardinality="1"/>
  <Role Name="Child" Type="ClassValue" Cardinality="*"/>
</RelationshipType>

<ClassType Name="WebApplication" Base="ClassValue"/>

<ClassType Name="IIS6" Base="ClassValue">
  <Setting Name="WorkerProcessEnabled" Type="boolean"/>
</ClassType>

<RelationshipType Name="IIS6HostsWebApplication"
                  Base="HostDependency">
  <Role Restricts="Host" Type="IIS6"/>
  <Role Restricts="Guest" Type="WebApplication"/>
</RelationshipType>

<ClassType Name="SqlDatabase" Base="ClassValue"/>

<RelationshipType Name="Communication">
  <Role Name="Client" Type="WebApplication" Cardinality="*"/>
  <Role Name="Server" Type="SqlDatabase" Cardinality="*"/>
</RelationshipType>

<EnumerationType Name="SqlAuthenticationMode">
  <EnumerationValue Name="Sql" Value="0"/>
  <EnumerationValue Name="Windows" Value="1"/>
  <EnumerationValue Name="Mixed"  Value="2"/>
</EnumerationType>

<ClassType Name="SqlServer2000" Base="ClassValue" Abstract="true">
  <Setting Name="AuthenticationMode" Type="SqlAuthenticationMode"/>
</ClassType>

<!-- Note that SqlServerHostsDatabase restricts the types of
     the Guest and Host roles of HostDependency -->
<RelationshipType Name="SqlServerHostsDatabase"
                  Base="HostDependency">
  <Role Restricts="Host" Type="SqlServer2000" />
  <Role Restricts="Guest" Type="SqlDatabase"/>
</RelationshipType>

<ClassType Name="SqlServer2000Enterprise" Base="SqlServer2000"/>
<ClassType Name="SqlServer2000Standard" Base="SqlServer2000"/>
```

```xml
<!-- This class captures the operational knowledge for the
     e-Commerce web site -->
  <ClassType Name="eCommerceSite">
    <Setting Name="MaxUsers" Type="uint64"/>

<!-- An eCommerceSite can contain 1 or more instances
         of WebApplication and catalog database-->
    <Part Name="webapp" Type="WebApplication"
          RelationshipType="Contains" Multiplicity="1..*"
          Role="Child"/>
    <Part Name="catalogdb" Type="SqlDatabase"
          RelationshipType="Contains" Multiplicity="1..*"
          Role="Child"/>
    <!-- An eCommerceSite must contain exactly 1
         instance of transacation database-->
    <Part Name="transactiondb" Type="SqlDatabase"
          RelationshipType="Contains" Multiplicity="1" Role="Child"/>

<!-- An eCommerceSite can contain 1 or more
         instances of IIS6 and SqlServer2000Standard-->
    <Part Name="webserver" Type="IIS6"
          RelationshipType="Contains" Multiplicity="1..*"
          Role="Child"/>
    <Part Name="catalogSqlServer" Type="SqlServer2000Standard"
          RelationshipType="Contains" Multiplicity="1..*"
          Role="Child"/>

<!-- An eCommerceSite must contain exactly 1
         instance of SqlServer2000Enterprise -->
    <Part Name="transactionSqlServer" Type="SqlServer2000Enterprise"
          RelationshipType="Contains" Multiplicity="1" Role="Child"/>
```

```xml
<!-- Each instance of webapp must be hosted
        on a separate instance of webserver -->
  <Connector Name="webhost" Type="IIS6HostsWebApplication">
    <End Part="webapp" Role="Guest" Cardinality="1"/>
    <End Part="webserver" Role="Host" Cardinality="1"/>
  </Connector>

<!-- All instances of catalogdb must be hosted
        on the single instance of catalogSqlServer -->
  <Connector Name="cataloghost" Type="SqlServerHostsDatabase">
    <End Part="catalogdb" Role="Guest" Cardinality="1..*"/>
    <End Part="catalogSqlServer" Role="Host" Cardinality="1"/>
  </Connector>

<!-- The single instance of transactiondb must
        be hosted on the single instance of transactionSqlServer -->
  <Connector Name="transactionhost" Type="SqlServerHostsDatabase">
    <End Part="transactiondb" Role="Guest" Cardinality="1"/>
    <End Part="transactionSqlServer" Role="Host" Cardinality="1"/>
  </Connector>

<!-- Each instance of webapp communicates
        with a separate instance of catalogdb-->
  <Connector Name="webcatalog" Type="Communication">
    <End Part="webapp" Role="Client" Cardinality="1"/>
    <End Part="catalogdb" Role="Server" Cardinality="1"/>
  </Connector>

<!-- All instances of webapp communicates with
        the single instance of transactiondb -->
  <Connector Name="webtransaction" Type="Communication">
    <End Part="webapp" Role="Client" Cardinality="1..*"/>
    <End Part="transactiondb" Role="Server" Cardinality="1"/>
  </Connector>
```

```
<!-- WorkerProcess must be enabled for
        each instance of webserver-->
    <Constraint Name="WorkerProcessMustBeEnabled" Language="Sequences"
                Severity="block"
                ErrorMessage="Worker Process must be enabled for all
                            web servers">
      webserver.all(WorkerProcessEnabled==true)
    </Constraint>

<!-- Windows Authentication must be
        enabled on transactionSqlServer-->
    <Constraint Name="WindowsAuthOnTransactionSqlServer"
                Language="Sequences"
                Severity="block"
                ErrorMessage="Windows Authentication must be enabled">
      transactionSqlServer.all(AuthenticationMode==Windows)
    </Constraint>

</ClassType>
```

```
<ClassType Name="eCommerceSite">
    <Setting Name="MaxUsers" Type="uint64"/>
    <Part Name="webapp" Type="WebApplication"
            RelationshipType="Contains" Multiplicity="*" Role="Child"/>

<!--other details omitted-->

<Constraint Name="UsersPerWebApplication" Language="Sequences"
                Severity="1">
      webapp.count()*1000 >= MaxUsers
    </Constraint>
</ClassType>
```

230

```
<ClassType Name="eCommerceSite">
    <Setting Name="MaxUsers" Type="uint64"/>

<Part Name="webapp" Type="WebApplication"
            RelationshipType="Contains" Multiplicity="*" Role="Child"/>

<!-- Performance related recommended invariant -->
    <Constraint Name="UsersPerWebApplication" Language="Sequences"
                Severity="1" Category="Performance,Recommended"
                >
      webapp.count()*1000 >= MaxUsers
    </Constraint>
</ClassType>
```

```
<ClassType Name="FaultToleranteCommerceSite"
           Base="eCommerceSite" Derivation="restriction">
  <Part Restricts="webserver" Multiplicity="2..*"/>
  <Part Restricts="catalogSqlServer" Multiplicity="2..*"/>
</ClassType>
```

234

```
<ClassType Name="MusicStore"
           Base="eCommerceSite" Derivation="extension">
  <Part Name="mediaserver" Type="MediaServer"
        RelationshipType="Contains" Multiplicity="1..*"
        Role="Child"/>

</ClassType>
```

FIG. 12

MODELING IT OPERATIONS/POLICIES

BACKGROUND

The IT (Information Technology) systems owned and operated by various businesses and institutions can be highly complex. A typical IT system may entail multiple computers with numerous pieces of interconnected software on each computer. The deployment, configuration, and management of these IT systems is manually intensive and is accomplished through ad-hoc combinations of human experience, communal knowledge, a collection of unrelated software tools, and documents that are often incomplete, out of date, hard to locate when needed, or difficult to understand. The manually intense operation of IT systems is often the cause of malfunctions and sub-optimally performing systems. Changes to IT systems are also typically managed informally, for example through email messages. If an IT system has, for example, a 3-tier application and a fix or change needs to be applied, there is no convenient way to determine whether the fix or change is valid or whether it will break the IT system. Such changes may be preceded by extensive testing. As an IT system becomes more complex, the ad hoc approach breaks down; information is not fully shared or becomes stale, inefficiencies and mistakes increase, etc. In sum, modern complex IT systems are managed using techniques that have changed slowly and have not improved with the increases in complexity of IT systems. There is no way to standardize the configuration of IT systems. This lack of standardization and lack of improvement in IT system management continues to expose businesses, institutions, and other enterprises to substantial risks and costs.

Absent standardized configuration tools and models, there is no sure or easy way to check whether the operational policies and preferences of an IT system are being met. There is no flexibility; changes and extensions of the IT system are difficult to validate. There are no systems by which some predefined components can be "programmed" to model or capture operational policy. Many of the problems mentioned above could be alleviated if there were ways to capture and formalize the operational knowledge of an IT system, that is, the knowledge associated with the desired configuration environment and operation of an IT system.

SUMMARY

The following summary is included only to introduce some concepts discussed in the Detailed Description below. This summary is not comprehensive and is not intended to delineate the scope of protectable subject matter, which is set forth by the claims presented at the end.

Operational policies for operating a business's or institution's actual or planned IT system may be modeled. The IT system may include components such as applications, application hosts, one or more networks or components thereof, hardware, and interrelationships between the components. The IT system is to be operated in accordance with operational policies that govern existence or numerosity of components, how the components are interrelated, how the components and interrelationships are configured, and/or manual or automated processes for managing and maintaining the IT system. The modeling may involve generating code that conforms to a language by declaring abstractions using types that correspond to the components of the IT system, by declaring types of interrelationships that correspond to the interrelationships of the IT system, and by defining constraints upon and between the types, where the constraints correspond to policies of operating the IT system.

Many of the attendant features will be more readily appreciated by referring to the following detailed description considered in connection with the accompanying drawings.

DESCRIPTION OF THE DRAWINGS

Like reference numerals are used to designate like parts in the accompanying Drawings.

FIG. 7 shows code defining various relationship types and class types used in the example in FIG. 6.

FIGS. 8-10 show code declaring a complex class type that captures operational knowledge of an e-commerce web site.

FIG. 11 shows examples of operational policies in the form of rules or constraints.

FIG. 12 shows examples of derivation by restriction or extension.

DETAILED DESCRIPTION

Embodiments discussed herein relate to capturing operational knowledge of an IT system in a model by using a formal language. More specifically, a declarative model captures the operational knowledge of an IT system—information pertaining to the configuration environment, the policies, and the ongoing operation and management of an IT system. Such a knowledge-capturing declarative model is formed using the typing system of a formal language, such as XML (or a modeling schema based thereon), UML, C#, and so on (the particular language is not important).

Once established, such a model can have many uses. A model unambiguously communicates the operational knowledge of the IT system to all interested parties, such as IT administrators, system operators, system architects, developers, testers, etc. It can be used as a basis to drive an agreement about what an IT system should do and how it should function. Different stakeholders can review the model and agree or disagree with expectations for the IT system. Such a model can be used to actually configure a system in the real world. Furthermore, a well declared model can be used to periodically check whether the real world system is in compliance with the model and various invariants that it may capture. Also, proposed changes to the IT system can be validated against the model (and therefore the knowledge and policies that the model embodies) before they are applied to the IT system. Being based on a language, a model can be easily interpreted, compiled, manipulated, richly visualized, and so on.

Figure 1:
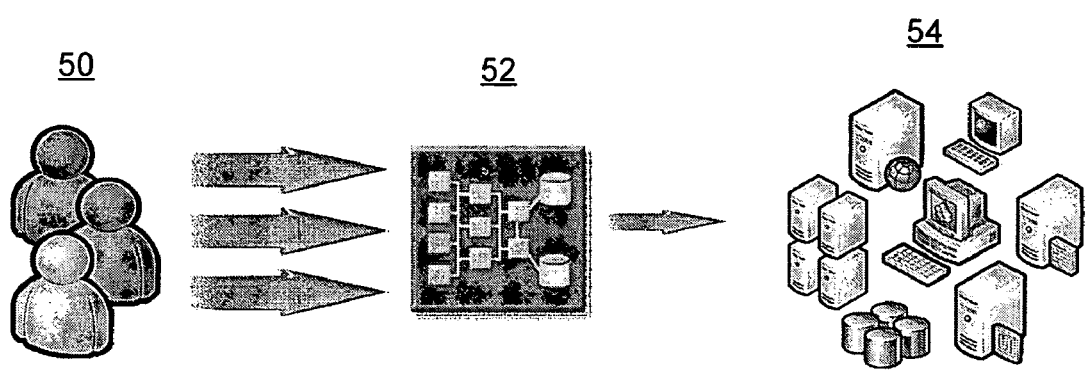
FIG. 1 shows a community having operational knowledge, a model, and an IT system.

FIG. 1 shows a community 50 having operational knowledge, a model 52, and an IT system 54. The operational knowledge is embodied or captured in a model 52. The model 52 can be used to configure, validate, understand, etc., the IT system 54. Notably, the model 52 is separate from and independent of the IT system 54 itself. The model 52 reflects the desired or preferred state of the IT system 54. In other words, although the model 52 is independent of the real world, it may model types of information found in the real world IT system 54 (e.g., servers, applications, etc.), and it may model that information not necessarily as it is, but rather as it should be.

In sum, the model 52 captures a desired state of configuration and can allow a correlation between what the IT system 54 is and what it should be.

Figure 2:
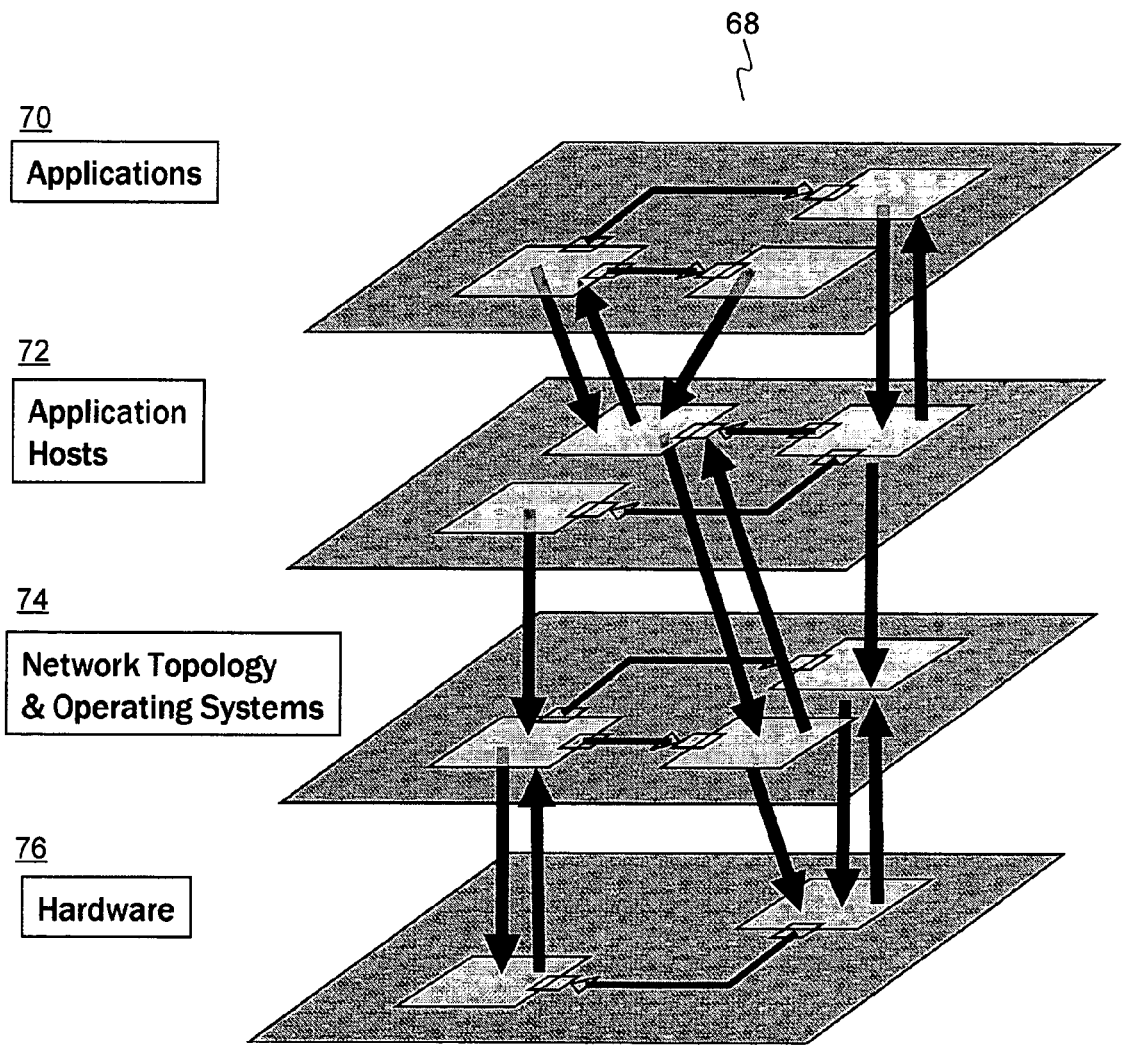
FIG. 2 shows layers representable by a model.

As mentioned, a language is used to declare a model of an IT System in a way that includes information pertinent to deployment and/or ongoing operations. The model is like a blueprint of an IT system. As seen in FIG. 2, a model 52/68 can capture the structure of an IT system, that is, the various pieces of the IT system, and how they relate to each other (e.g., a web application communicates with a catalog DB, a catalog DB is hosted on SQL, etc.). Model 68 may model any or all layers of an IT system. A model such as model 68 may declare any types of applications 70, application hosts 72, network components and operating systems 74, and even hardware 76. Applications 70 might be data access clients, or information worker productivity tools, or network-type applications coded in Java or ASP.NET. Application hosts 72 might be any web servers, or Internet Information Server in worker process isolation mode, to name a few examples. Network components 74 might be as simple as a data network, but can be any component for networking. Operating systems 74 might be Windows based, Unix based, virtualized operating systems, or others. Hardware 76 is also unlimited, but might include typical computer components such as peripheral devices, memory, CPUs, storage, RAID configurations, etc.

A model of an IT system also captures constraints or invariants—a set of rules or policies that should or must remain true for the system to be considered optimal or operational (e.g., a host customer transaction DB must be on an SQL cluster, each DFS instance must have at least three servers, at least two targets must exist for each link, the targets for a link should be hosted on distinct file servers, etc.).

Figure 3:
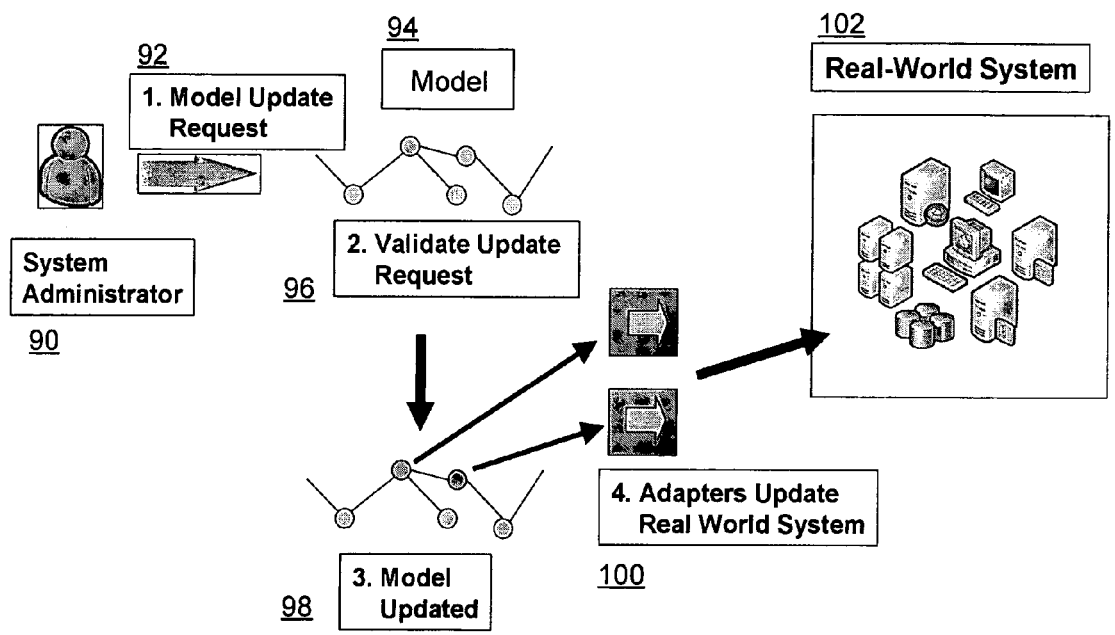
FIG. 3 shows one use of a model of an IT system.

FIG. 3 shows one use of a model of an IT system. A system administrator 90 might submit a model update request 92 against a model 94. The request 92 can be validated 96 against the model 94, and if all of the rules, constraints, or invariants of the model 94 remain satisfied, the model 94 may be updated with the request 92. An updated model 98 can then be used, for example, to drive adapters 100 that provide a bridge between the updated model 98 and a real world IT system 102. For example, there might be an adapter for SQL servers, and that adapter might implement a policy or constraint in the updated model 98 by changing configuration parameters of an SQL server in the real world IT system 102. As mentioned, a model can have many other uses.

Figure 4:
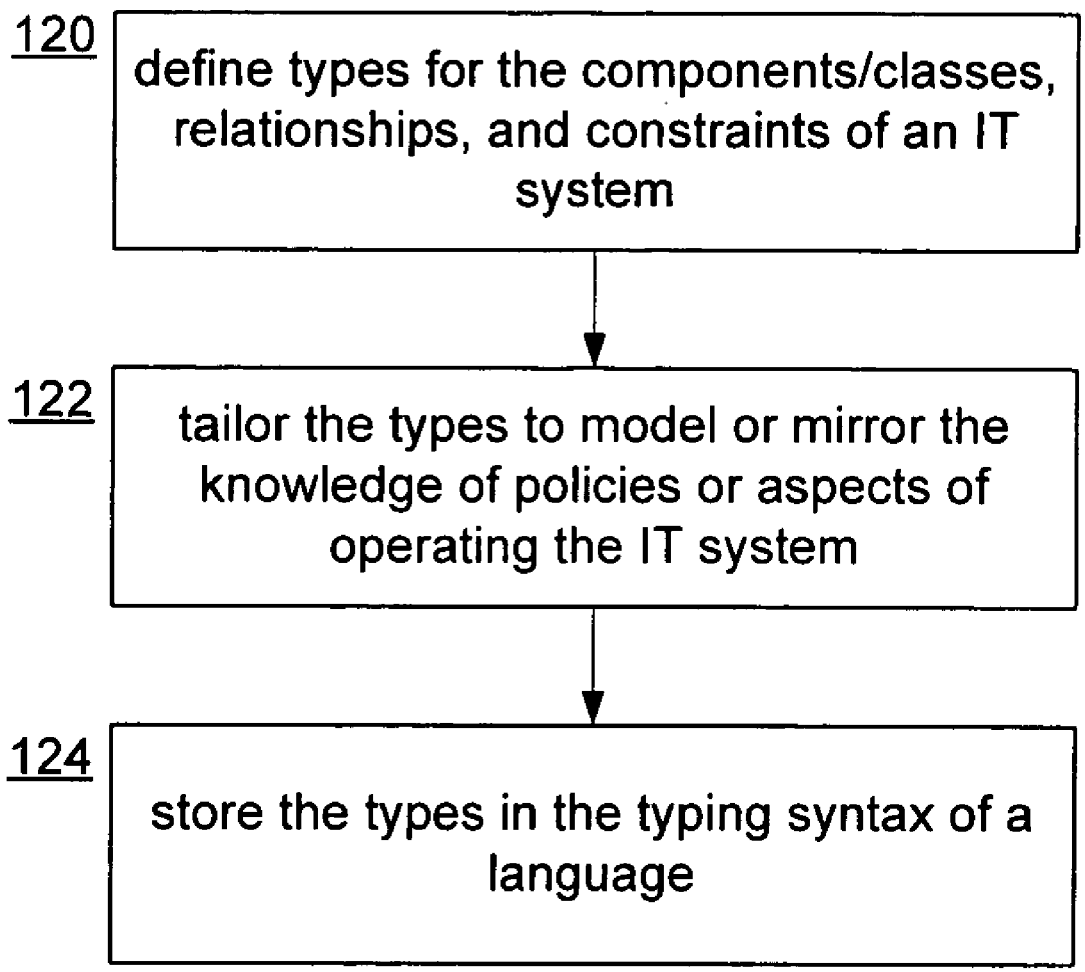
FIG. 4 shows a process for declaring a model.

FIG. 4 shows a process for declaring a model. First, a person generating the model defines 120 types for the components/classes, relationships, and constraints of an IT system. Then the person tailors 122 the types to model or mirror the knowledge of policies or aspects of operating the IT system. The types are stored 124 in the typing syntax of a language being used to declare the model. Further details follow.

Figure 5:
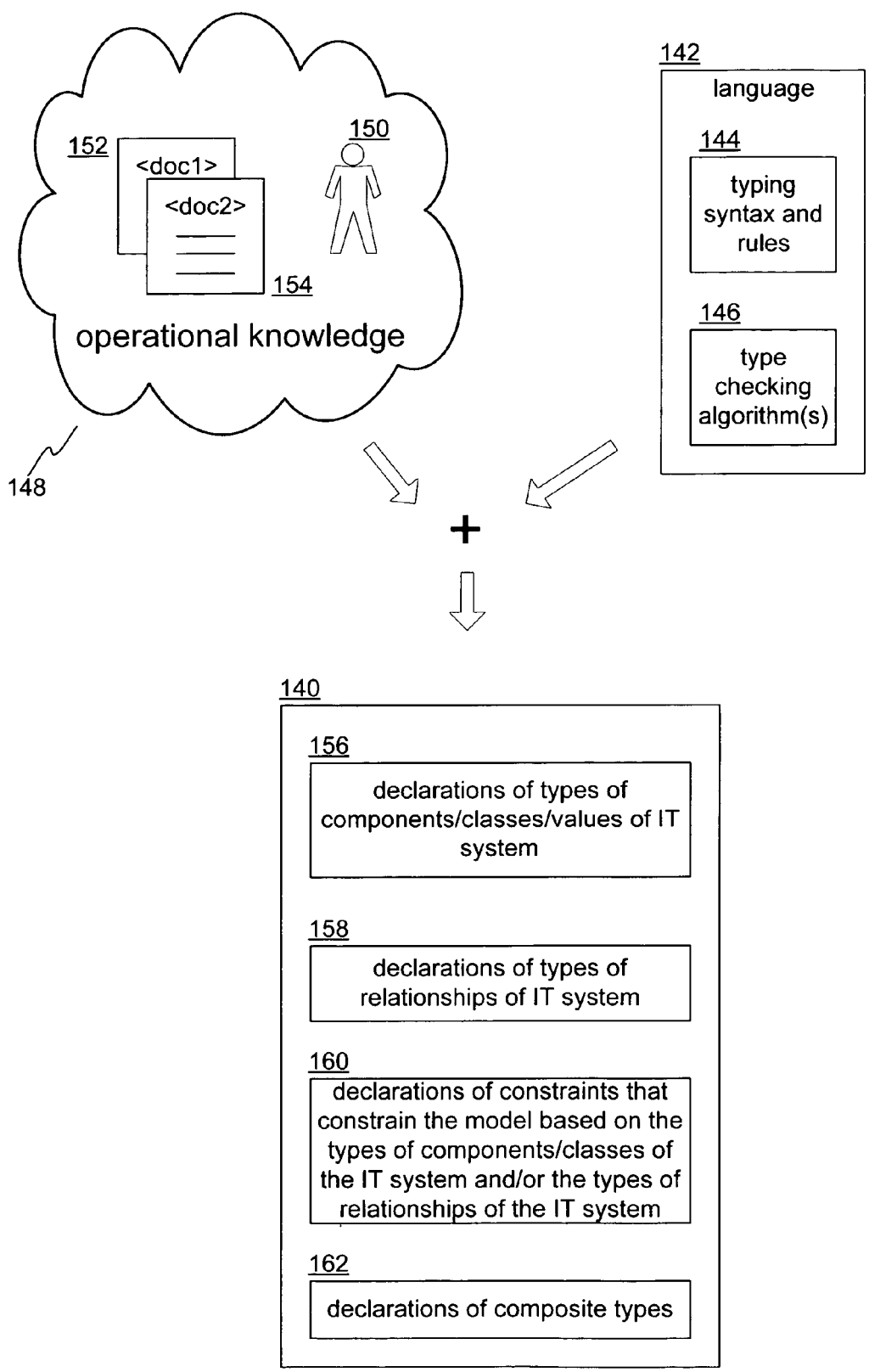
FIG. 5 shows a declarative model.

FIG. 5 shows a declarative model 140. The model 140 can be generated as with the process of FIG. 4. A designer generating the model 140 may start by choosing some particular language 142. The language 142 should have a type system 144 including rules and syntax 144 for declaring and using types and a type checking algorithm 146 (a typechecker) for ensuring that source code has no typing violations. A type system is the component of a typed language that keeps track of the types of variables and, in general, the types of expressions in the language. A type system can describe whether a program or code is well behaved or well formed. A type system may involve other aspects such as scoping rules, type equivalence, and so on. Finally, a type system should be enforceable; type declarations should be capable of being statically checked to some extent. A type system is useful for modeling operational knowledge of an IT system because types express static (as opposed to algorithmic) knowledge about things. It should be noted that a typechecker or type checking algorithm 146 is helpful for using a declarative model in various ways, it is not necessary for actually building a declarative model.

Returning to FIG. 5, the human designer may gather all of the available operational knowledge 148 that is desired to be modeled. This might involve obtaining knowledge from people 150, or from documents 152, 154. Document 152 might be an informal document such as an email, a loosely maintained "operation policies" document, etc. Document 154 might be a more formal document, such as an IBM Redbook, an ITIL (IT Infrastructure Library) publication, some manual of institutional IT policies, a document from a software publisher indicating preferred ways of configuring or installing an application, and so on.

Having chosen a language 142 and gathered operational knowledge 148, the designer may proceed by declaring or defining 120 types for the components/classes, relationships, and constraints of an IT system.

Types of classes/components and relationships form the software and hardware building blocks for models of IT systems. Some types may be value types, which are predefined types such as Integers, strings, booleans, enumerations, etc. Class or component types typically represent basic systems and resources and may have properties that capture invariant state that is to be modeled and maintained. Constraint types operate on or between properties that capture invariant requirements.

A relationship type represents a semantic relationship between two or more classes. A relationship type can represent any arbitrary relationship including "communication between", "reference to", "hosting of/on", "delegation", "interaction of a particular kind", "what objects another object can contain", "which endpoints can be connected together", "what environments can host a particular object", and so on. Containment types of relationships can be used as a basic building block to define the containment structure of a model. A relationship type may have properties to represent invariant state associated with the relationship, and a relationship may be constrained.

Composite or complex types may be used to build complex, multipart types. A composite type may be convenient to model real-world systems (or sub-systems) and may typically (but not always) include details regarding scale and deployment of a system. A composite type may contain (by reference or value) objects of any class type, to represent the system's resources. A composite type may contain connectors of any relationship type, to represent relationships between the composite's objects. A composite type may also contain constraints or rules on or between objects that capture the invariant requirements (or preferences) of the composite. In sum, a composite type is a contextualized composition of classes and relationships along with desired state, structure, constraints, and behavior.

Types of constraints may also be defined. A constraint represents an invariant for instances (objects) of a given class or relationship (connection) type. Constraints can constrain values or structure. A constraint is typically a boolean expression that has access to properties/roles/ . . . etc. A constraint can usually be evaluated as being either true or false, where an evaluation of false indicates that the constraint is violated or its recommendation is not satisfied.

Given the types that can be defined 120 by a person designing the model 140, and given the language 142 and operational knowledge 148, the designer defines the types of classes, relationships, constraints, and/or composites that will be needed to model an IT system. The designer tailors 122 the types to model or capture the operational knowledge 148. Details of how this is performed will become more apparent as examples are discussed with reference to FIGS. 6-12. The process to this point is a design process; types can be defined 120 and tailored 122 any number of ways; pencil and paper, modeling tools, etc. However, when the types are finalized they are stored 124, in the typing syntax 144 of the language 142, as declarations of types of classes (or components or values) 156, declarations of types of relationships 158, declarations of constraints 160 that constrain the model 140, and declarations of composite types 162. The model 140 and its type definitions or declarations 156-162 may be stored 124 as one or more electronic files or documents in any computer readable media such as magnetic media, optical media, volatile or non-volatile memory, and so on. Furthermore, the model 140 might be transformed, for example by compilation, into machine code, byte code, intermediary code, or the like.

Figure 6:
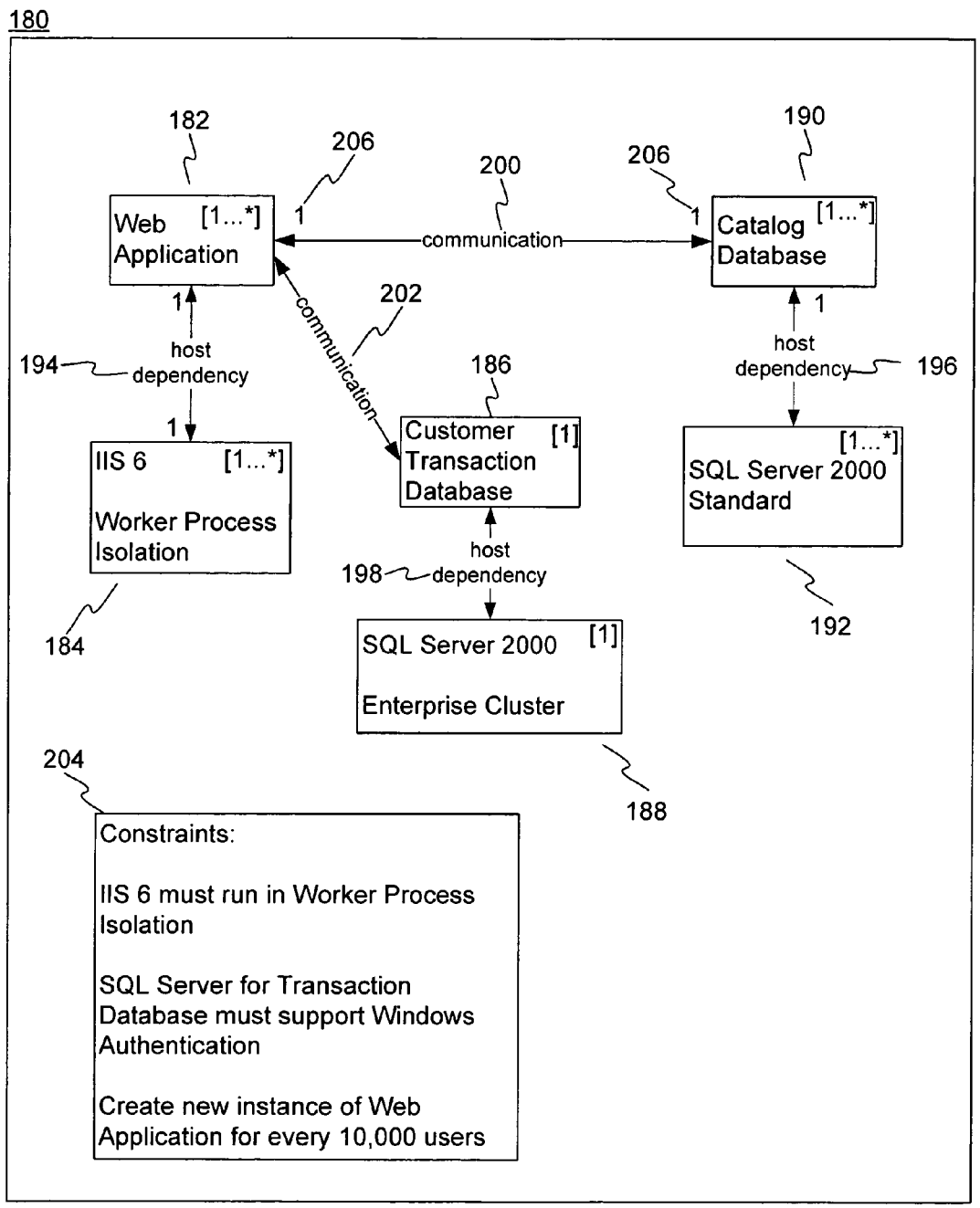
FIG. 6 shows another representation of a model.

FIG. 6 shows another representation of a model. Coded definitions of model 180 will be discussed with reference to FIGS. 7-12. Model 180 represents a desired e-commerce web system. Some of the class types are: web application 182, worker process isolation 184, customer transaction database 186, SQL server (cluster) 188, catalog database 190, and SQL server (standard) 192. Some of the relationship types are: host dependency 194, 196, 198, and communication 200, 202. As will be discussed, a number of operational constraints 204 are also captured by the model 180.

Some of the relationships may have numerosity invariants. For example, communication relationship 200 has a numerosity invariant 206 that one entity must be at each end of the relationship 200. Some of the classes also have numerosity invariants (see the upper right hand corners of the boxes representing classes 182-192). For example, SQL server (standard) 192 may be one or more occurrences ("[1 .. *]") of the same.

FIG. 7 shows code 220 defining various relationship types and class types used in the example in FIG. 6. Regardless of the language chosen for modeling, the type declarations have some construct or information indicating that they are type declarations and indicating the kind of type that is being declared, e.g., "RelationshipType", which indicates a type of relationship is being declared, or "ClassType", which indicates a type of class is being declared. Most of the types and properties thereof declared in the FIG. 7 are self-explanatory. As will be seen, these base types can serve as parts of more complex composite types.

FIGS. 8-10 show code 222, 224, 226 declaring a complex class type that captures operational knowledge of an e-commerce web site. The parts and relations declared as parts and connections of the eCommerceSite complex class are types defined in FIG. 7. The eCommerceSite captures several operational aspects or policies. It specifies numerosities of its constituents. It also specifies connectors between parts, as well as end points and roles. FIG. 10 shows some other operational knowledge in the form of constraints of the eCommerceSite type. A constraint named WorkerProcess-MustBeEnabled is defined to require that all IIS6 webserver parts (see FIG. 8) must have their WorkerProcessEnabled property set to true. This does not actually set the properties of webserver members of e-commerce instances, rather it declares a desired constraint on the e-commerce type; that instances of e-commerce types will not be valid if all of their worker processes are not enabled. Another constraint specifies that all transactionSqlServers must have their authentication mode (AuthenticationMode) set to "Windows".

FIG. 11 shows example 228, 230 of operational policies in the form of rules or constraints. In example 228, webapp objects of the eCommerceSite class are defined to have no more than 1,000 users per application. In example 230, the constraint is categorized as being recommended for performance.

Constraints or rules can be fashioned from almost any piece of information. Furthermore, constraints can be built up as boolean expressions that can be evaluated as being true or false. Logical operators such as "all of", "none of", and the like may be used to construct these expressions. Complex multi-operator expressions can be constructed. A set of boolean expressions can be in the universe of expressions defined roughly by: expression=expression <operator> expression, or expression=term; where operators are things such as math operators, boolean operators, and so on, where terms can be any of the types defined in the model (e.g. relationships, classes, etc.), or properties of the types, or constants, or even global information such as dates, times, or settings of the main model itself. See C#, .Net, or Java for similar definitions of boolean expressions. Thus, almost any type of operational constraint of an IT system can be modeled. Constraints can be typed as either strict constraints or advisory constraints, however, the constraints are otherwise declared in the same way. Other types of constraints or invariants can also be defined, so, for example, constraints can be validated based on their type.

In view of the discussion and examples above, it should be clear that policies of a desired IT system being modeled (an e-commerce web system) are able to be established using declarative constructs and without requiring the construction of algorithmic or behavioral code. Furthermore, although the examples are coded in XML, other languages can be used. For example, declarations in the style of C# could as easily be used, and even if behavior in the form of executable statements is included in such code, the declarative code (type declarations) can be considered logically separate from such behavioral code. In other words, the model's validity can be tested (using type checking, rule testing, invariant testing, etc.) without regard for any behavior that might incidentally be included in the model's code.

FIG. 12 shows examples 232, 234 of derivation by restriction or extension. The operational knowledge captured in a model can be reused and refined through derivation. Derivation by restriction can be used to specialize the knowledge captured in an existing model. As seen in example 232, in the case of the model for the eCommerce site, the model can be reused (restrictively derived) to define a model for a fault-tolerant eCommerce site that has at least two web servers and at least two catalog servers, so that it is resilient against the failure of one web server or one catalog database server. A base model can also be derived by extension. Derivation by extension can be used to extend the knowledge captured in a model. As seen in example 234, the eCommerce site model can be extended to define the model for an online music store that has media servers in addition to web servers and database servers.

In conclusion, those skilled in the art will realize that storage devices utilized to store program instructions can be distributed across a network. For example a remote computer may store an example of the process described as software. A local or terminal computer may access the remote computer and download a part or all of the software to run the program.

Alternatively the local computer may download pieces of the software as needed, or distributively process by executing some software instructions at the local terminal and some at the remote computer (or computer network). Those skilled in the art will also realize that by utilizing conventional techniques known to those skilled in the art, all or a portion of the software instructions may be carried out by a dedicated circuit, such as a DSP, programmable logic array, or the like.

All of the embodiments and features discussed above can be realized in the form of information stored in volatile or non-volatile computer or device readable medium. This is deemed to include at least media such as CD-ROM, magnetic media, flash ROM, etc., storing machine executable instructions, or source code, or any other information that can be used to enable a computing device to perform the various embodiments. This is also deemed to include at least volatile memory such as RAM storing information such as CPU instructions during execution of a program carrying out an embodiment.

The invention claimed is:

1. A method, the method comprising:
   generating, on a computer, a model of an information technology (IT) system that models policies for deploying, configuring, and operating the IT system, the model comprising type declarations in the typing syntax of a declarative language, where the type declarations together model the policies for configuring and operating the IT system, and where the type declarations declare types of classes/components of the IT system, types of relationships between classes/components of the IT system, and constraints of the IT system, wherein the types of classes/components comprise types of hosts, types of servers, and types of applications, and wherein the types of relationships comprise hosting relationships, dependency relationships, delegation relationships, and communications relationships; and
   storing the model in a computer readable medium.

2. A method according to claim 1, wherein the constraints model constraints of operating, deploying, and configuring the IT system.

3. A method according to claim 1, wherein a new model is derived from the model by adding a declaration that either extends the model with a new declaration or that restricts the model by restricting a type declared in the model.

4. One or more computer-readable media having stored thereon computer-executable instructions that, upon execution by a computer, program the computer to perform operations as recited in claim 1.

5. A method, the method comprising:
   generating, on a computer, a model of an information technology (IT) system that models policies for deploying, configuring, and operating the IT system, the model comprising type declarations in the typing syntax of a declarative language, where the type declarations together model the policies for configuring and operating the IT system, and where the type declarations declare types of classes/components of the IT system, types of relationships between classes/components of the IT system, and constraints of the IT system, wherein the constraints comprise expressions comprising operators operating on components of the IT system and/or relationships of the IT system, where the expressions can be evaluated for truth to determine whether the constraint is satisfied, where the declarative language has an expression syntax for constructing expressions, and the expressions that comprise the constraints are in a form complying with the expression syntax; and
   storing the model in a computer readable medium.

6. A method, the method comprising:
   generating, on a computer, a model of an information technology (IT) system that models policies for deploying, configuring, and operating the IT system, the model comprising type declarations in the typing syntax of a declarative language, where the type declarations together model the policies for configuring and operating the IT system, and where the type declarations declare types of classes/components of the IT system, types of relationships between classes/components of the IT system, and constraints of the IT system;
   passing an instance of the model to an implementation of the language that comprises at least a type checking algorithm and that verifies whether the instance satisfies the policies of the model; and
   storing the model in a computer readable medium.

7. A method according to claim 6, wherein the types of classes/components comprise types of hosts, types of servers, and types of applications, and wherein the types of relationships comprise hosting relationships, dependency relationships, delegation relationships, and communications relationships.

8. One or more computer-readable media having stored thereon computer-executable instructions comprising:
   computer-executable instructions that, upon execution by a computer, program the computer with a definition of a model of an information technology (IT) system, the definition comprising:
   source or compiled code of a declarative language, the source or compiled code comprising:
       declarations of types software and hardware components, where the types of components are declared to have properties that model policies of operating the IT system;
       declarations of types of relationships between components, where the types of relationships are declared to have properties that model policies of operating the IT system; and
       declarations of constraints on the relationships and components, where the constraints constrain combinations of relationships and components in a way that models policies of operating the IT system, wherein some of the constraints further comprise information indicating classifications of the constraints; and
   the computer executable-instructions further comprising a component that, upon execution by the computer, programs the computer to employ the definition to determine whether the IT system is being operated in accordance with the policies of operating the IT system.

9. One or more computer-readable media according to claim 8, where the definition further comprises restrictive derivations of that extend or refine the policies of operating the IT system.

10. One or more computer-readable media according to claim 8, wherein the declarations of the constraints comprise expressions comprising operators operating on components and/or relationships, where the expressions are susceptible to truth evaluation.

11. One or more computer-readable media having stored thereon computer-executable instructions comprising:
computer-executable instructions that, upon execution by a computer, program the computer with a definition of a model of an information technology (IT) system, the definition comprising:
source or compiled code of a declarative language, the source or compiled code comprising:
declarations of types software and hardware components, where the types of components are declared to have properties that model policies of operating the IT system;
declarations of types of relationships between components, where the types of relationships are declared to have properties that model policies of operating the IT system; and
declarations of constraints on the relationships and components, where the constraints constrain combinations of relationships and components in a way that models policies of operating the IT system; and
where the definition specifies invariant aspects of the IT system that must be satisfied for the IT system; and
the computer executable-instructions further comprising a component that, upon execution by the computer, programs the computer to employ the definition to determine whether the IT system is being operated in accordance with the specified invariant aspects of the IT system.

12. One or more computer-readable media having stored thereon computer-executable instructions that, upon execution by a computer, program the computer with a definition of a model of an IT system, the definition comprising:
source or compiled code of a declarative language, the source or compiled code comprising:
declarations of types software and hardware components, where the types of components are declared to have properties that model policies of operating the IT system;
declarations of types of relationships between components, where the types of relationships are declared to have properties that model policies of operating the IT system; and
declarations of constraints on the relationships and components, where the constraints constrain combinations of relationships and components in a way that models policies of operating the IT system; and
the computer executable-instructions further comprising:
information indicating a state of the IT system; and
a component for using the definition to determine whether changes to the state of the IT system would violate the policies of operating the IT system.

13. One or more computer-readable media having stored thereon computer-executable instructions comprising:
computer-executable instructions that, upon execution by a computer, program the computer with a definition of a model of an information technology (IT) system, the definition comprising:
source or compiled code of a declarative language, the source or compiled code comprising:
declarations of types software and hardware components, where the types of components are declared to have properties that model policies of operating the IT system;
declarations of types of relationships between components, where the types of relationships are declared to have properties that model policies of operating the IT system; and
declarations of constraints on the relationships and components, where the constraints constrain combinations of relationships and components in a way that models policies of operating the IT system; and
the computer-executable instructions further comprising a definition of a second model derived from the model by adding a declaration that either extends the model with a new declaration or that restricts the model by restricting a type declared in the model; and
the computer executable-instructions further comprising a component that, upon execution by the computer, programs the computer to employ the definitions to determine whether the IT system is being operated in accordance with at least one of the models of the IT system.

14. One or more computer-readable media according to claim 13, wherein some of the constraints further comprise information indicating classifications of the constraints.

15. A method of modeling operational policies of operating a business's or institution's actual or planned information technology (IT) system, where the IT system comprises components comprising applications, application hosts, one or more networks or components thereof, hardware, and interrelationships between the components, and the IT system is to be operated in accordance with operational policies that govern existence or numerosity of components, how the components are interrelated, how the components and interrelationships are configured, and manual or automated processes for managing and maintaining the IT system, the method comprising:
generating, on a computer, code that conforms to a language by:
declaring types of classes that correspond to the components of the IT system;
declaring types of interrelationships that correspond to the interrelationships of the IT system; and
defining constraints upon and between the types, where the constraints correspond to the operational policies of operating the IT system; and
wherein the code is independent of the IT system.

16. A method according to claim 15, wherein the types are declared with portions of declarative code in accordance with syntax and semantics of a typing system of the language.

17. A method according to claim 16, wherein the constraints comprise expressions that are within the universe of boolean expressions defined by the language.

18. A method according to claim 17, wherein the constraints constrain some of the abstract types such that instances of the abstract types can be validated against the constraints.

19. A method according to claim 15, further comprising automatically determining whether instances of the declared types satisfy operational policies modeled by the types.

20. A method according to claim 15, further comprising automatically determining whether a proposed modification to an instance of one of the types would violate the operational policies.

* * * * *